United States Patent [19]
Arai

[11] Patent Number: 5,647,087
[45] Date of Patent: Jul. 15, 1997

[54] JOINT SPACER FOR THE YOKE OF A WINDSHIELD WIPER

[75] Inventor: Masaru Arai, Kazo, Japan

[73] Assignee: Nippon Wiperblade Co., Ltd., Saitama-ken, Japan

[21] Appl. No.: 591,769

[22] Filed: Jan. 25, 1996

[51] Int. Cl.⁶ .................................................. B60S 1/38
[52] U.S. Cl. ........................ 15/250.46; 15/250.44; 403/24
[58] Field of Search ................... 15/250.46, 250.32, 15/250.44, 250.451, 250.452, 250.453, 250.454, 250.48, 250.31; 403/24, 119, 220

[56] References Cited

U.S. PATENT DOCUMENTS

| | | | |
|---|---|---|---|
| 3,864,783 | 2/1975 | Arman | 15/250.46 |
| 3,879,792 | 4/1975 | Brummer et al. | 15/250.46 |
| 4,286,351 | 9/1981 | Mower et al. | 15/250.46 |
| 5,183,352 | 2/1993 | Carpenter | 15/250.46 |
| 5,271,122 | 12/1993 | Roth et al. | 15/250.46 |

FOREIGN PATENT DOCUMENTS

| | | | |
|---|---|---|---|
| 607822 | 11/1928 | Switzerland | 15/250.32 |
| 2041730 | 9/1980 | United Kingdom | 15/250.46 |
| 2168600 | 6/1986 | United Kingdom | 15/250.46 |

*Primary Examiner*—Gary K. Graham
*Attorney, Agent, or Firm*—Birch, Stewart, Kolasch & Birch, LLP.

[57] ABSTRACT

A joint spacer member for a pivotable connection between first and second yokes of a windshield wiper assembly includes a longitudinally extending U-shaped portion including first and second sides with a connecting side extending therebetween, the U-shaped portion having a first longitudinal end and a second longitudinal end, each of the first and second sides having a central section and resilient sections, wherein the resilient sections extend at an incline with respect to each of the central sections from each of the central sections to each of the ends.

3 Claims, 2 Drawing Sheets

JOINT SPACER FOR THE YOKE OF A WINDSHIELD WIPER

BACKGROUND OF THE INVENTION

This invention relates to a windshield wiper and, particularly, to a windshield wiper adapted for use in a vehicle such as an automobile and the like.

A typical prior art windshield wiper comprises a wiper arm, a primary yoke member connected pivotally to one end of the wiper arm at the lengthwise central portion thereof, a pair of secondary yoke members connected respectively and pivotally to the opposite ends of the primary yoke member, and a blade rubber assembly connected to opposite ends of respective secondary yoke members.

Usually, the yoke members have respectively generally U-shaped form having spaced apart side walls at the pivotal connecting portions, and a pivot pin extends through respective side walls of the inner and outer members. Further, a spacer member is usually disposed between side walls of the outer and inner members. The spacer member acts to absorb excessive clearance in the sidewise direction or in the direction of the axis of the pivot pin, and to reduce the friction during the pivotal movement.

However, in such prior art construction, there are shortcomings that manufacturing tolerance of the yoke members and the spacer member tends to cause excessive clearance, and excessive axial clearance tends to cause a noisy sound.

The present invention aims to overcome above described shortcomings in the windshield wiper.

SUMMARY OF THE INVENTION

According to the present invention, there is provided a windshield wiper including at least two pivotally connected yoke members, in which a resilient portion is provided at a connecting portion pivotally connecting the yoke members with the resilient portion being resiliently deformable in the widthwise direction of the yoke members. The resilient portion may be provided on either one or on both of the yoke members. Otherwise, the resilient portion may be provided on a spacer which is disposed between the yoke members.

According to the invention, it is possible to reduce excessive clearance between the yoke members in the direction of the axis of the pivot pin without reducing the manufacturing tolerance of the yoke members, thereby reducing the noisy sounds of the wiper during operation, and to prevent insufficient wiping condition.

BRIEF DESCRIPTION OF THE DRAWINGS

The features of the present invention that are believed novel are set forth in the appended claims. The invention, together with further objects and advantages thereof, may best be understood from the following description taken in conjunction with the accompanying drawings, in which.

DETAILED DESCRIPTION OF THE EMBODIMENTS

Figure 4:
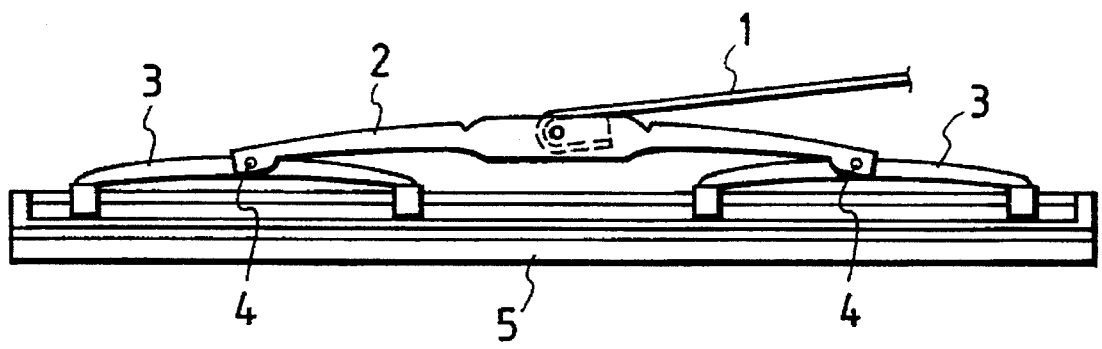
FIG. 4 is a schematic side view of a typical prior art windshield wiper, with a portion of a wiper arm being omitted.

In FIG. 4, an end of a wiper arm 1 is pivotally connected to a generally lengthwise central portion of a primary yoke member 2, and opposite ends of the primary yoke member 2 are respectively connected pivotally to secondary yoke members 3 and 3 through pivot pins 4 and 4. The opposite ends of the secondary yoke members 3 and 3 are connected respectively with a blade rubber assembly 5.

It will be understood that the arrangement shown in FIG. 4 is an example, and the number and the arrangement of the yoke members is not limited to that shown in the drawing. For example, there may be provided one or more third yoke members connected pivotally to one or more ends of the secondary yoke members 3 and 3. Alternatively, one end of the primary yoke member 2 may be connected directly to the blade rubber assembly 5 with one of the secondary yoke members 3 and 3 being omitted.

Figure 3:
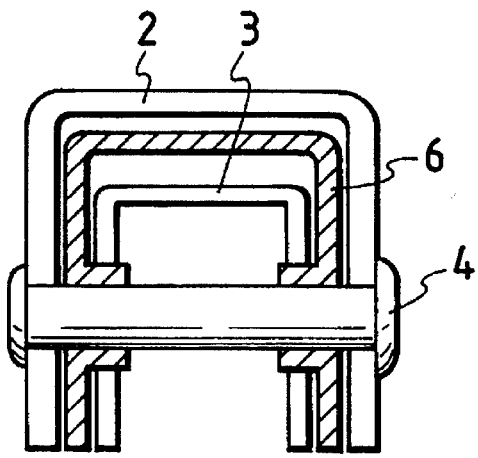
FIG. 3 is a schematic sectional view of a connecting portion between yoke members of a typical prior art windshield wiper.

Usually, the yoke members 2 and 3 have, respectively, as shown in FIG. 3, generally U-shaped form having spaced apart side walls at the pivotal connecting portions, and a pivot pin 4 extends through respective side walls of the yoke members 2 and 3. Further, a spacer member 6 is disposed between side walls of the yoke members 2 and 3. The spacer member 6 acts to absorb excessive clearance between the yoke members 2 and 3 in the sidewise direction or in the direction of the axis of the pivot pin 4, and to reduce the friction during the pivotal movement.

In the construction shown in FIG. 3, there are shortcomings that manufacturing tolerance of the yoke members 2 and 3 and the spacer member 6 tends to cause excessive clearance, and the yoke member 3 tends to move in the direction of the axis of the pivot pin due to excessive axial clearance, which may cause insufficient wiping and generate a noisy sound.

Figure 1:
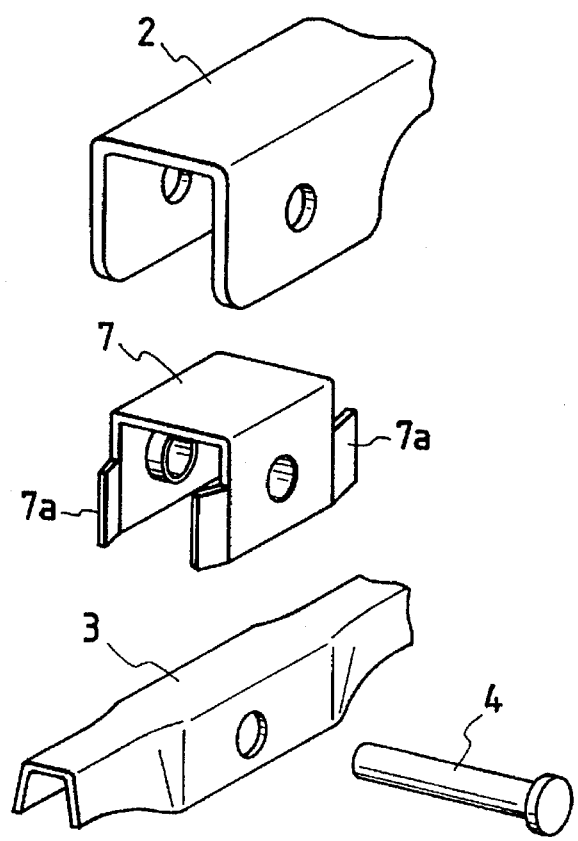
FIG. 1 is a schematic exploded perspective view of a connecting portion between yoke members of a windshield wiper according to an embodiment of the present invention.

FIG. 1 is a schematic exploded perspective view of a connecting portion between a yoke member 2 and a yoke member 3 of a windshield wiper according to an embodiment of the present invention. The yoke members 2 and 3 are generally similar to those shown in FIGS. 3 and 4. A spacer member 7 is disposed between the yoke members 2 and 3, and a pivot pin 4 extends through respective side walls of the yoke members 2 and 3 and of the spacer member 7. The opposite end portions 7a and 7a of the spacer member 7 in the lengthwise directions of the yoke member 3 are bent resiliently inward or toward the yoke member 3 such that, in the assembled condition, the opposite end portions 7a and 7a of the spacer member 7 resiliently contact with the outer surfaces of the opposite side surfaces of the yoke member 3, thereby absorbing clearance between the yoke members 2 and 3.

Figure 2:
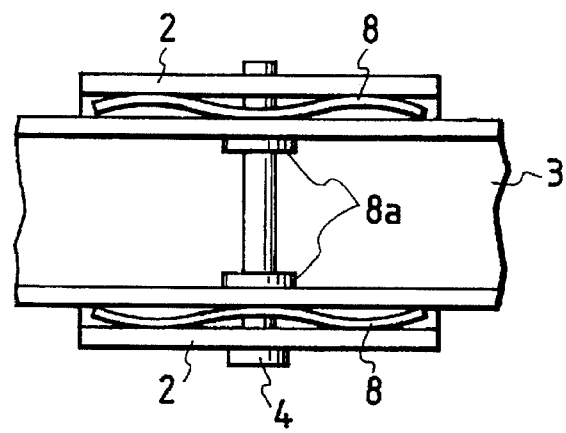
FIG. 2 is a schematic bottom view of a connecting portion between yoke members of a windshield wiper according to another embodiment of the present invention.

FIG. 2 shows another embodiment of the invention, in which, resilient spacers 8 and 8 are disposed respectively between the yoke members 2 and 3. Incidentally, there are provided tubular portions 8a and 8a on the spacers 8 and 8 respectively to guide and support the pivot pin 4 and the yoke member 3.

The function and the effect of the second embodiment are similar to that of the first embodiment.

As described above, according to the present invention, it is possible to reduce excessive clearance between the yoke members in the direction of the axis of the pivot pin without reducing the manufacturing tolerance of the yoke members, thereby reducing the noisy sounds of the wiper during operation, and to prevent insufficient wiping condition.

It will be understood that the embodiments shown and described as above are mere preferable embodiments, but the invention is not limited to these embodiments, and many other modifications or changes may be applied for those skilled in the art within the scope and spirit of the following claims.

I claim:

1. In a windshield wiper assembly including a first yoke for pivotal connection to a wiper arm, a second yoke pivotally coupled at a pivot connection to the first yoke by a pivot pin and supporting a blade rubber, said first yoke saddling said second yoke to define a clearance space therebetween, and a spacer member provided in said clearance space between the first and second yokes at said pivot connection, the improvement comprising:

said spacer member defined by first and second spaced side walls with a connecting wall extending therebetween such that said spacer member forms a U-shaped portion, said U-shaped portion extends between first and second longitudinal ends, each of said first and second side walls includes a central section and means for absorbing the clearance space between the yokes, said means comprising a pair of resilient sections, wherein said pair of resilient sections extend, respectively, from said first and second longitudinal ends of an associated central section, said resilient sections are resiliently biased about said longitudinal ends, respectively, to contact outer surfaces of the second yoke and are biased thereagainst to absorb the clearance space between the first and second yokes.

2. In an assembly according to claim 1 wherein said resilient portions together with the respective central section forms a serpentine shape.

3. In an assembly according to claim 2 wherein each of said central sections has an aperture therethrough, the apertures being substantially co-axial, and a tubular structure surrounding each of the apertures supporting said pivot pin inserted therethrough.

* * * * *